Figure 1:
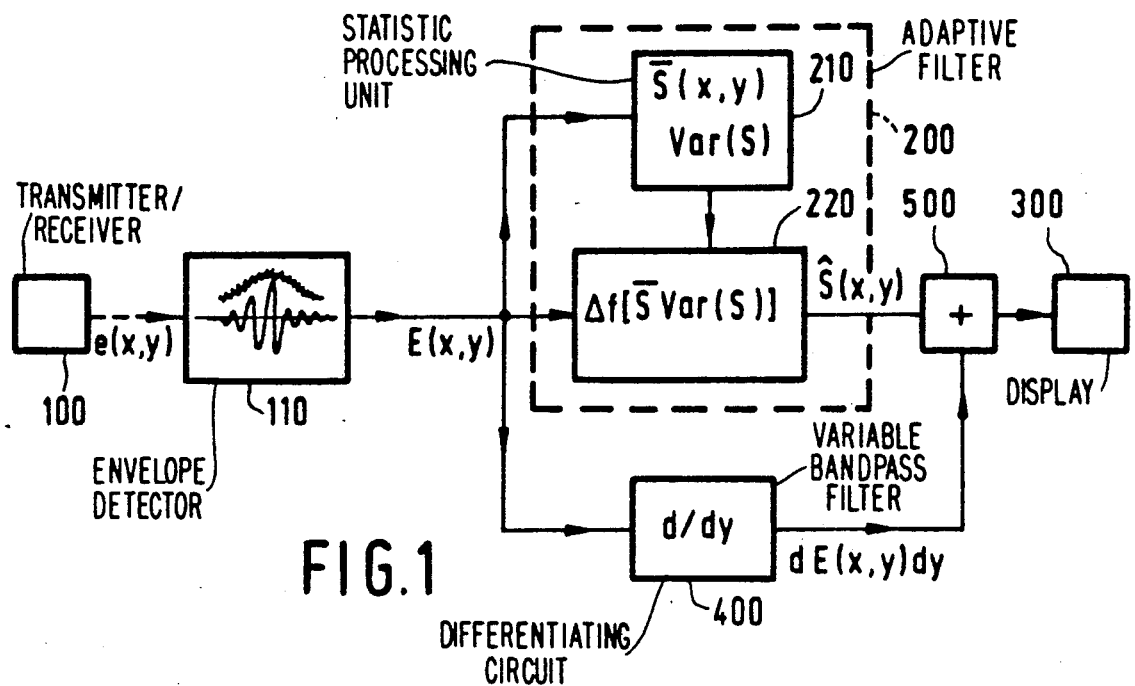

United States Patent [19]

Collet-Billon

[11] Patent Number: 5,050,226
[45] Date of Patent: Sep. 17, 1991

[54] ULTRASONIC ECHOGRAPHIC IMAGING DEVICE UTILIZING AN IMPROVED ADAPTIVE FILTER

[75] Inventor: Antoine Collet-Billon, Paris, France

[73] Assignee: U.S. Philips Corporation, New York, N.Y.

[21] Appl. No.: 496,478

[22] Filed: Mar. 20, 1990

[30] Foreign Application Priority Data

Mar. 24, 1989 [FR] France .................. 89 03931

[51] Int. Cl.$^5$ .................. G06K 9/00; G01V 1/00
[52] U.S. Cl. .................. 382/54; 73/602; 73/620; 73/626; 128/660.1; 364/413.25; 367/45
[58] Field of Search ........ 382/54, 1; 73/602, 620, 73/628; 364/413.25; 128/660.01, 660.07, 660.09, 661.01; 367/32, 45

[56] References Cited

U.S. PATENT DOCUMENTS 4,771,470 9/1990 Geiser et al. .................. 382/54
4,783,839 11/1988 Bamber .................. 382/54

OTHER PUBLICATIONS

PCT Published Application WO 86/03594, Jeffrey Bamber, Jun. 19, 1986.
Improved Techniques in Ultrasonic Cross Sectional Echography by G. Kossoff, Ultrasonics, Sep. 1972, pp. 221-227.
Kuan, Sawshuk, Strand, & Chavel, "Adaptive Restoration of Images with Speckle", IEEE Transactions on Acoustics, Speech, and Signal Processing, vol. ASSP-35, No. 3, Mar. 1987, pp. 373-383.
Kossoff, G., "Improved Techniques in Ultrasonic Cross Sectional Echography", Ultrasonics, Sep. 1972, pp. 221-227.
Burckhardt, Christoph B., "Speckle in Ultrasound B-Mode Scans", Jan. 1978 IEEE Transactions on Sonics and Ultrasonics, vol. SU-25, No. 1, pp. 1-6.
Fink, M., "Imagerie Ultrasonore", Revue de Physique Appliquee, 18 (1983) pp. 527-556.
D. T. Kuan, A. A. Sawchuk, T. C. Strand & P. Chavel, "Adaptive Restoration of Images with Speckle", IEEE Transactions on Acoustics, Speech and Signal Processing, vol. ASSP-35, No. 3, Mar. 1987, pp. 373-383.

Primary Examiner—Leo H. Boudreau
Attorney, Agent, or Firm—William Squire

[57] ABSTRACT

An ultrasonic echographic imaging device for two dimensions (x, y), includes an adaptive filter for reducing the interference noise in the images obtained. A first circuit differentiates the signal (E(x, y)) applied to the adaptive filter and a second circuit forms the weighted sum of the signal ($\hat{S}(x, y)$) leaving the adaptive filter (200) and the signal (dE(x, y)/dy) output of the differentiating circuit.

2 Claims, 1 Drawing Sheet

ULTRASONIC ECHOGRAPHIC IMAGING DEVICE UTILIZING AN IMPROVED ADAPTIVE FILTER

The invention relates to a device for imaging by two-dimensional ultrasonic echography, comprising an adaptive filter for reducing the interference noise in the images obtained.

The invention is used particularly advantageously in the field of medical echography, and especially for the imaging of organs.

The general technical problem to be solved by any ultrasonic echographic imaging device in most cases consists of the formation of an exact as possible image of the medium being examined, i.e. exact as regards contours and as regards specular walls it contains.

Of interest is copending application Ser. No. 347,553 filed May 4, 1989 by A. Collet-Billon entitled "Ultrasonic Echography Device with Reduced Interference Noise" and assigned to the assignee of the present invention.

Various solutions have already been proposed to this general technical problem. Reference is made notably to the article by M. Fink "Imagerie ultrasonore", published in Revue de Physique Appliquée 18 (1983) pp. 527-556 which exhaustively analyses the various aspects of echographic imaging. Even though they often lead to satisfactory results, all solutions known from the state of the art have given limitations. Actually, the determination of contours of organs and the detection of low-contrast objects are disturbed by the constructive and destructive interference of the echoes produced by the numerous scatter points contained in the medium studied, that is to say in relation to the coherent nature of the ultrasonic wave emitted by the piezo-electric transducer used. In the acoustic field this phenomenon is analogous to that which is known as "speckle" in the optical field and which gives rise to "light grains" which are often encountered in relation to laser emission. The major drawbacks of this interference noise in the ultrasonic field consist on the one hand of a deterioration of the quality of the echographic images, notably a reduction of the visibility in low-contrast areas, and on the other hand of a wide frequency band with a large variance which, for example renders the conventional contour detection methods inefficient.

Therefore, it will be obvious that the reduction of "speckle" is a decisive factor for improving the quality of echographic images. To this end various methods have been proposed:

on the one hand, methods which concern the processing of the signal before acquisition in order to decorrelate the speckle, for example, the spatial composition method (see the article by C. B. Burkhardt in IEEE Trans. Sonics Ultrasonics, SU25 1-6 (1978)). These methods generally produce echographic images of good quality. However, they have the drawback that they necessitate the use of a complex and elaborate electronic processing device. Moreover, the acquisition time is comparatively long, which is hardly compatible with the aim to obtain real-time images. Actually, the execution of these known processing methods necessitates an increase of the number of data acquired by a factor N which in principle leads to a contrast gain amounting to $\sqrt{N}$.

on the other hand, smoothing methods which are performed after the formation of the image, for example, use a lowpass filter which effectively reduces the fluctuations due to "speckle" but which makes the images fuzzy because it blurs the contours.

Another known method of this kind consists in the use of an adaptive filter, an example of which is described in British Patent Application GB-A-2 168 482 corresponding to U.S. Pat. No. 4,783,839. In ultrasonic echography the adaptive filters operate so that in the relevant region of the image one or more statistical parameters are determined, being also the measure of a characteristic value of the "speckle". Subsequently, after having estimated the degree of similarity between the signal to be processed and the interference noise on the basis of the characteristic value, the signal is filtered in dependence on the degree of similarity obtained. The adaptive filter acts somehow as a variable bandpass filter:

in a region where the statistical processing reveals that the image is essentially formed by speckle, the adaptive filter operates as a lowpass filter, whilst for example upon passage through specular walls of organs where the useful signal is much more intense than the interference noise, it behaves as an all-pass filter which thus preserves the sharpness of the image contours. Even though this type of filter cannot pretend to produce results which are as good as those obtained by the methods of the spatial composition type, the contrast of the echographic image is substantially improved. However, adaptive filtering has a given number of drawbacks. First of all, the "smoothing" effect may cause the disappearance of small objects from the image. On the other hand, even when the image contours are preserved during the filtering operation, the visual impression of such an image is not very attractive, because the eye appreciates the presence of high frequency components, notably for better accommodation.

Thus, the technical problem to be solved by the invention is to propose a two-dimensional ultrasonic echographic imaging device comprising an adaptive filter for reducing the interference noise in the images obtained, which device enables the restoration of significant details which would disappear because of the adaptive filtering operation, thus improving the visual quality of the image.

The solution to the technical problem in accordance with the invention consists in that the device comprises a circuit for differentiating the signal entering the adaptive filter and a circuit for forming the weighted sum of the signal leaving the adaptive filter and the signal output by the differentiating circuit.

Thus, the non-filtered derivative of the signal entering the adaptive filter adds the high frequency components of the "speckle" noise to the signal output of the filter, thus making the image more agreeable to the eye. On the other hand, at the contours in the image where the signal varies more quickly, the derivative assumes an appreciable value and, as will be demonstrated hereinafter, instead of being detrimental this effect offers the advantage that the contours are enhanced, imparting also an impression of grazing lighting to the ultimate image. Moreover, the details contained in the signal are thus more perceptible.

Finally, because in an echogram the walls are suitably visible only perpendicular to the axis of propagation of the ultrasonic signals, the differentiating circuit is formed by a circuit for obtaining the derivative in the axial direction.

Figure 2A:
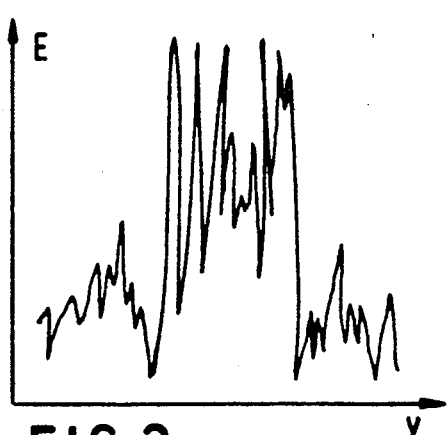
Figure 2B:
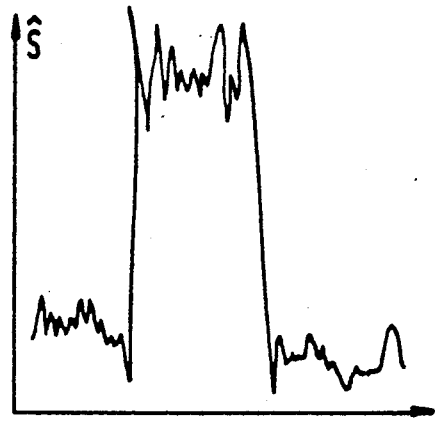
Figure 2C:
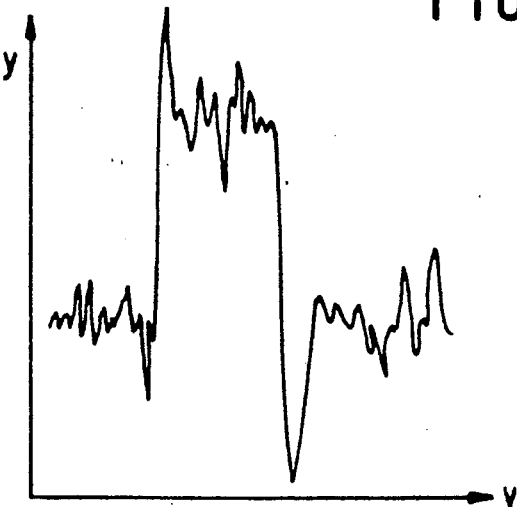

The invention will be described in detail hereinafter, by way of a non-limitative example, with reference to the accompanying diagrammatic drawings; therein:

FIG. 1 shows a block diagram of the filtering section of an imaging device in accordance with the invention, FIG. 2a shows an echographic signal containing interference noise on the input of the adaptive filter, FIG. 2b shows a signal extracted from the signal of FIG. 2a after adaptive filtering, and FIG. 2c shows the signal of FIG. 2b whereto the derivative of the signal shown in FIG. 2a has been added.

FIG. 1 shows the diagram of an ultrasonic echographic imaging device for two dimensions x, y. Thereinafter, x denotes the direction transversely of the direction of propagation, generally referred to as the lateral direction, and y denotes the axial direction, that is to say the direction parallel to the propagation direction of an ultrasonic scanning beam emitted by a transmitter/receiver unit 100 which is not shown in detail but which comprises a customary piezo-electric transducer which converts the electric excitation signals received from a transmitter stage into periodic trains of ultrasonic pulses. A receiver stage outputs the echographic signals e(x, y) returned to the piezo-electric transducer by the medium being examined.

As appears from FIG. 1 an envelope detector 110 supplies, on the basis of the echographic signal e(x, y) delivered by the transmitter/receiver unit 100, a signal E(x, y) wherefrom the rf component has been removed by demodulation and which is referred to as an envelope. The example of an envelope signal in the axial direction y, as shown in FIG. 2a, contains a substantial amount of interference noise. In order to reduce this "speckle" noise, the envelope E(x, y) is treated by an adaptive filter 200 whose general principle is described in detail in the article "Adaptive Restoration of Images with Speckle" by D. T. Kuan et al, Transactions on acoustics, speech and signal processing, Vol. ASSP-35, No. 3, March 1987, p. 373. The adaptive filter 200 is formed mainly by a variable bandpass filter 220 whose passband $\Delta f$ is a function of the values, estimated by a statistical processing unit 210, of statistical parameters which are extracted from the envelope signal E(x, y) and which are generally formed by a mean value and a variance. It is to be noted that the filtering result obtained depends on the model chosen for the interference noise as well as on given simplifying hypotheses.

By way of example, a particular adaptive filter based on the relation which relates the signal s(x, y) is given devoid of speckle noise to the envelope signal e(x, y) by way of the formula:

$$E(x,y) = | \sum_{x,y} h(x,y;x',y')s(x',y')\exp[j\,\phi(x',y')] | \quad (1)$$

where the function h is the pulse response of the echography device and $\phi$ is a random phase. By using the hypotheses that s(x, y) varies slowly with respect to h, that the envelope signals are not spatially correlated, and that $\phi$ is a random variable uniformly distributed between $-\pi$ and $\pi$, the "speckle" will behave as a multiplicative noise so that it is possible to calculate, by applying spatial averaging within a window F(x, y) centered around the point (x, y), the mean value $\bar{S}(x, y)$ and the variance var[S(x, y)] of the intensity S(x, y) of the signal s(x, y). The result depends highly on the choice of the window F(x, y). Taking into account the fact that the axial resolution is usually better than the lateral resolution, it is advantageous to choose a window which is larger in the lateral direction than in the axial direction. A better result is also obtained when instead of a mean value within the window, a weighted mean value is taken which favors the points situated in the center. The dimensions of the window should also vary as a function of the gradual variation of the axial and the transverse resolution of the echography device as a function of depth.

On the basis of the values of $\bar{S}(x,y)$ and Var[S(x,y)] thus supplied by the statistical processing unit 210, the variable bandpass filter 220 supplies the following estimate, using conventional linear and quadratic mean value estimation techniques:

$$\hat{S}(x,y) = \bar{S}(x,y) + \frac{\text{Var}[S(x,y)]}{2\text{Var}[S(x,y)] + \bar{S}(x,y)} [E^2(x,y) - \bar{S}(x,y)]$$

It appears from this formula that when the variance is small, that is to say when the signal is supposed to contain only "speckle" noise, S(x, y) is equal to the mean value $\bar{S}(x, y)$ and the adaptive filter behaves as a lowpass filter. However, in the regions of the image where a large variance occurs, for example at the abrupt transitions corresponding to the contours of organs, the estimate $\hat{S}(x, y)$ equals $\frac{1}{2}[E^2(x,y)+\bar{S}(x,y)]$, implying the addition of a part of the non-filtered input signal to the mean value.

FIG. 2b shows the smoothing effect obtained when the signal of FIG. 2a is applied to the adaptive filter described above. It clearly shows that the signal thus filtered preserves the image contours and at the same time is substantially void of interference noise. However, as has already been mentioned, the disappearance of the major part of the high frequencies in the signal shown in FIG. 2b has the dual drawback that the image is not agreeable to the eye and that small details disappear from the echographic image. Therefore, as is shown in FIG. 1, there is provided a circuit 400 for differentiating the signal E(x, y) entering the adaptive filter. In the device shown in FIG. 1, the circuit 400 is a circuit for obtaining the derivative in the axial direction y which produces approximately the derivative dE(x,y)/dy from E(x, y). This form of differentiation is to be preferred because the most important echo returned by the contours originates from the axial direction. Subsequently, the output signal $\hat{S}(x, y)$ of the adaptive filter 200 and the output signal of the circuit 400 are added by a weighted sum forming circuit 500 which enables the addition of the desired high frequency components to the filtered signal $\hat{S}(x, y)$. FIG. 2c shows a superposition of the estimate of FIG. 2b and the derivative of the initial signal E(x, y) of FIG. 2a. It appears that in FIG. 2c a substantial enhancement of the contours is achieved in a positive sense or in a negative sense, producing a pleasant grazing lighting effect for the observer.

The output signal of the weighted-sum forming circuit 500 is treated in known manner by a display unit 300 which comprises, for example a logarithmic compression amplifier, a device for storage and scan conversion, and a display device.

What is claimed is:

1. An ultrasonic echographic imaging device for two dimensions (x,y), comprising an adaptive filter for reducing the interference noise in the images obtained in a signal E (x, y) derived from a scanning beam produced by an echographic imaging system, a circuit for differentiating the signal (E(x, y)) applied to said adaptive filter and a circuit for forming the weighted sum of a signal (S(x, y)) generated by the adaptive filter in response to said applied E(x, y) signal and a signal (dE(x, y)/dy) output by said differentiating circuit, the signal E(x, y) applied to the adaptive filter being the envelope of the echographic signal (e(x, y)) received, the output signal of said adaptive filter being given by:

$$\hat{S}(x,y) = \bar{S}(x,y) + \frac{Var[S(x,y)]}{2Var[S(x,y)] + \bar{S}(x,y)} [E^2(x,y) - \bar{S}(x,y)]$$

where Var[S(x,y)] and $\bar{S}$(x,y) are the variance and the mean value, respectively, of a signal S(x, y) which represents the intensity of a signal s(x, y) derived from the envelope E(x,y) by statistical deconvolution of the interference noise.

2. An ultrasonic echographic imaging device for two dimension S(x,y), comprising an adaptive filter for reducing the interference noise in the images obtained in a signal E (x,y) derived from a scanning beam produced by an echographic imaging system, a circuit for differentiating the signal (E(x,y)) applied to said adaptive filter and a circuit for forming the weighted sum of a signal (S(x, y)) generated by the adaptive filter in response to said applied E(x, y) signal and a signal (dE(x, y)/dy) output by said differentiating circuit, said differentiating circuit comprising a circuit for obtaining the derivative of signal E(x, y) in the axial direction (y) of the ultrasonic scanning beam, the signal (E(x, y) applied to the adaptive filter being the envelope of the echographic signal (e(x, y)) received, the output signal of said adaptive filter being given by:

$$S(x,y) = S(x,y) + \frac{Var[S(x,y)]}{2Var[S(x,y)] + S(x,y)} [E^2(x,y) - S(x,y)]$$

where Var(S(x,y)] and $\bar{S}$(x,y) are the variance and the mean value, respectively, of a signal S(x, y) which represents the intensity of a signal s(x, y) derived from the envelope E(x,y) by statistical deconvolution of the interference noise.

* * * * *